(12) United States Patent
Urano et al.

(10) Patent No.: US 11,572,049 B2
(45) Date of Patent: Feb. 7, 2023

(54) BRAKE CONTROL DEVICE (71) Applicant: ADVICS CO., LTD., Kariya (JP)

(72) Inventors: Tatsuya Urano, Okazaki (JP); Keita Nakano, Hamamatsu (JP); Terushige Uraoka, Kariya (JP)

(73) Assignee: ADVICS CO., LTD., Kariya (JP)

(*) Notice: Subject to any disclaimer, the term of this patent is extended or adjusted under 35 U.S.C. 154(b) by 373 days.

(21) Appl. No.: 16/326,999

(22) PCT Filed: Aug. 9, 2017

(86) PCT No.: PCT/JP2017/028992
§ 371 (c)(1),
(2) Date: Feb. 21, 2019

(87) PCT Pub. No.: WO2018/037923
PCT Pub. Date: Mar. 1, 2018

(65) Prior Publication Data
US 2019/0176790 A1 Jun. 13, 2019

(30) Foreign Application Priority Data

Aug. 24, 2016 (JP) .............................. JP2016-164042

(51) Int. Cl.
B60T 7/12 (2006.01)
B60T 13/74 (2006.01)
(Continued)

(52) U.S. Cl.
CPC .............. B60T 13/746 (2013.01); B60T 7/12 (2013.01); B60T 8/00 (2013.01); B60T 8/172 (2013.01); B60T 13/74 (2013.01)

(58) Field of Classification Search
CPC .......... B60T 13/746; B60T 13/74; B60T 8/00; B60T 8/172; B60T 7/12
See application file for complete search history.

(56) References Cited

U.S. PATENT DOCUMENTS 6,406,102 B1 * 6/2002 Arnold .................... B60T 13/74
303/20
8,560,162 B2 * 10/2013 Herges .................... B60T 8/327
701/29.7

(Continued)

FOREIGN PATENT DOCUMENTS

DE 102006029667 * 1/2007 ............ B60T 13/746
DE 102006029667 A1 * 1/2007 ............ B60T 13/746

(Continued)

OTHER PUBLICATIONS

International Search Report (with English translation) and Written Opinion issued in corresponding International Patent Application No. PCT/JP2017/037923, 6 pages (dated Nov. 7, 2017).

*Primary Examiner* — Donald J Wallace
*Assistant Examiner* — Daniel M. Robert
(74) *Attorney, Agent, or Firm* — Buchanan Ingersoll & Rooney PC (57) ABSTRACT A brake control device controls a hydraulic brake that generates hydraulic braking force and an electric parking brake that generates parking braking force different from the hydraulic braking force. The brake control device comprises: a detection unit that detects a parking brake operation for causing the electric parking brake to generate the parking braking force; and a control unit that causes the electric parking brake to generate the parking braking force when the hydraulic braking force per wheel generated by the hydraulic brake, after decreasing below the minimum first braking force per wheel required for maintaining the vehicle stop state only by the electric parking brake, is less than the first braking force, in association with the parking brake operation having been performed in a state where the stop state is maintained only by a hydraulic brake operation for (Continued)

causing the hydraulic brake to generate the hydraulic braking force.

4 Claims, 6 Drawing Sheets

(51) Int. Cl.
  *B60T 8/00* (2006.01)
  *B60T 8/172* (2006.01)

(56) References Cited

U.S. PATENT DOCUMENTS

| | | | |
|---|---|---|---|
| 2006/0186731 A1* | 8/2006 | Bach | B60T 7/107 |
| | | | 303/89 |
| 2008/0191546 A1* | 8/2008 | Plantamura | B60T 7/12 |
| | | | 303/28 |
| 2010/0211281 A1* | 8/2010 | Baier-Welt | B60T 8/1764 |
| | | | 701/70 |
| 2011/0240418 A1* | 10/2011 | Tachiiri | B60T 7/12 |
| | | | 188/72.4 |
| 2013/0192937 A1* | 8/2013 | Furuyama | B60T 13/66 |
| | | | 188/72.6 |
| 2013/0226425 A1* | 8/2013 | Oliveira | B60T 7/122 |
| | | | 701/70 |
| 2015/0061365 A1* | 3/2015 | Sakashita | B60T 13/741 |
| | | | 303/15 |
| 2016/0297415 A1* | 10/2016 | Kato | F02D 41/065 |
| 2016/0369725 A1* | 12/2016 | Shirai | F02D 41/2406 |

FOREIGN PATENT DOCUMENTS

| | | |
|---|---|---|
| JP | 4837565 B2 | 12/2011 |
| WO | WO-2005042327 A1 * | 5/2005 ............ B60T 13/74 |

* cited by examiner

FIG. 6

BRAKE CONTROL DEVICE

TECHNICAL FIELD

The present invention relates to a brake control device.

BACKGROUND ART

A technique of maintaining a stop state of a vehicle by using two types of braking forces, a hydraulic braking force by a hydraulic brake and a parking braking force by an electric parking brake, has been conventionally known.

CITATIONS LIST

Patent Literature

Patent Literature 1: Japanese Patent Publication No. 4837565

SUMMARY OF INVENTION

Technical Problems

In the conventional art as described above, in order to shift from maintaining the stop state by only the hydraulic brake to maintaining the stop state by only the electric parking brake, a parking braking force capable of maintaining the stop state is further generated in some cases while maintaining the hydraulic braking force capable of maintaining the stop state. Thus, in the above-described conventional art, a load corresponding to the sum of the hydraulic braking force and the parking braking force is applied to the brake device, whereby a load larger than the load corresponding to the braking force capable of maintaining the stop state is applied to the brake device and the durability of the mechanism is impaired in some cases.

Therefore, one of the objects of the present invention is to provide a brake control device capable of reducing a load applied to a brake device.

Solutions to Problems

A brake control device according to the present invention relates to, for example, a brake control device that controls a hydraulic brake capable of generating a hydraulic braking force and an electric parking brake capable of generating a parking braking force different from the hydraulic braking force, the brake control device including a detection unit that detects a parking brake operation for causing the electric parking brake to generate the parking braking force; and a control unit that causes the electric parking brake to generate the parking braking force in a case where the hydraulic braking force is smaller than a first braking force after a hydraulic braking force per one wheel generated by the hydraulic brake becomes lower than the first braking force per one wheel minimum required to maintain a stop state by only the electric parking brake, the accompanying parking brake operation being performed in a situation where the stop state of the vehicle is maintained only by the hydraulic brake operation for causing the hydraulic brake to generate the hydraulic braking force. The parking braking force thus can be avoided from being further generated in a situation where the hydraulic braking force greater than or equal to the first braking force is generated per one wheel, so that the load applied to the brake device can be reduced.

In the above brake control device, for example, the control unit causes the electric parking brake to generate the parking braking force in a case where the hydraulic braking force per one wheel is smaller than the first braking force and is greater than or equal to a second braking force per one wheel minimum required to maintain the stop state only by the hydraulic brake, after the hydraulic braking force per one wheel becomes lower than the first braking force. The stop state of the vehicle thus can be reliably maintained.

Furthermore, in the above brake control device, for example, the control unit controls a differential pressure control valve of the hydraulic brake independent from the hydraulic brake operation so that the second braking force is held in a case where the hydraulic braking force per one wheel drops to the second braking force. Thus, even in a case where the hydraulic brake operation is completely released, the hydraulic braking force per one wheel does not fall below the second braking force, and thus the stop state of the vehicle can be more reliably maintained.

Moreover, in the above-described brake control device, for example, the control unit controls timing to drive a motor of the electric parking brake so that timing at which the hydraulic braking force per one wheel drops to the second braking force coincides with timing at which the parking braking force starts to be generated. Thus, the shift from maintaining the stop state only by the hydraulic brake to maintaining the stop state only by the electric parking brake can be rapidly carried out.

DESCRIPTION OF EMBODIMENT

Embodiment

Hereinafter, an embodiment of the present invention will be described based on the drawings. The configuration of the embodiment described below and the operation and result (effect) brought about by the configuration are merely examples and are not limited to the contents described below.

Figure 1:
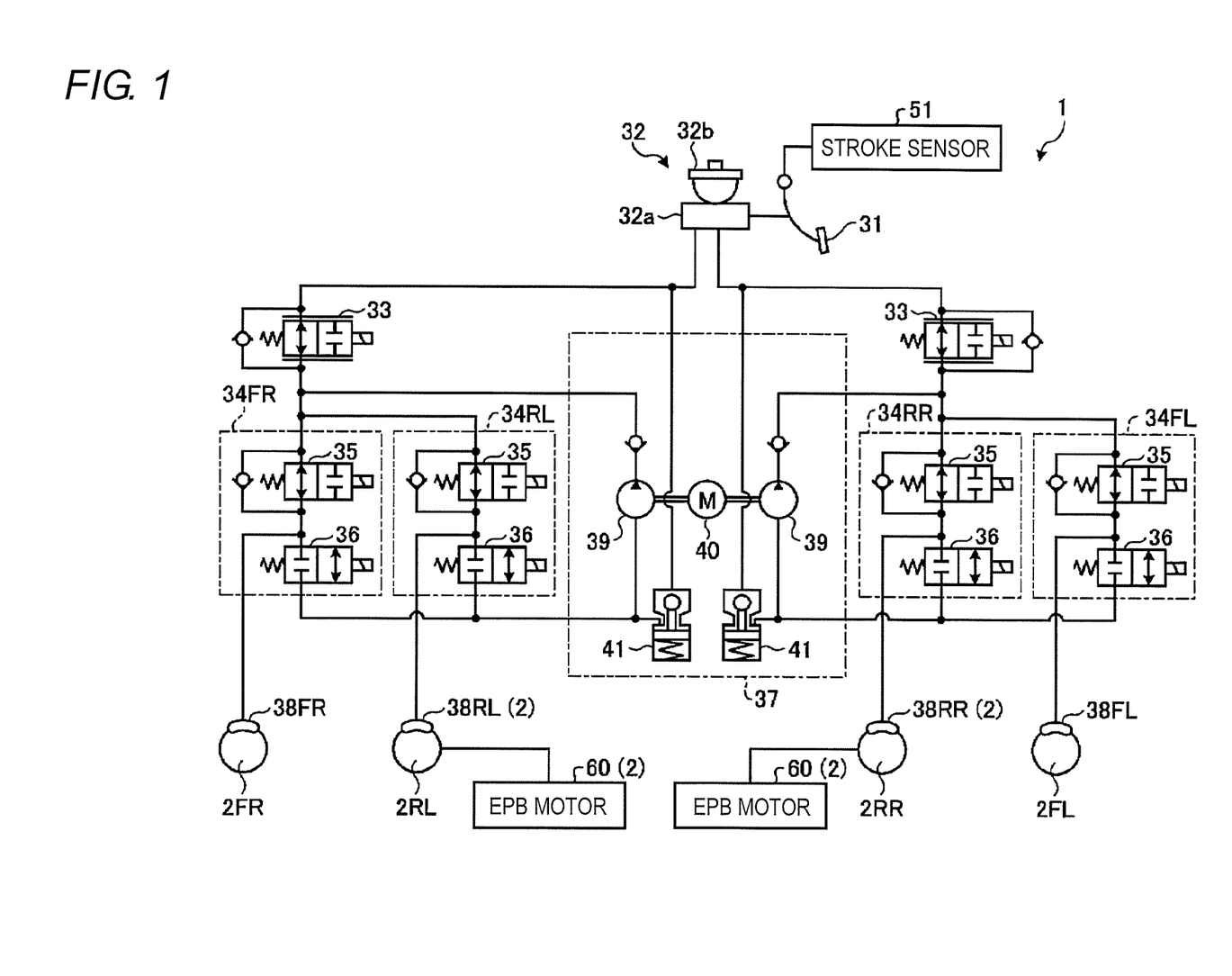
FIG. 1 is an exemplary configuration diagram showing a schematic configuration of a brake device to be controlled by a brake control device according to an embodiment.

FIG. 1 is an exemplary configuration diagram showing a schematic configuration of a brake device to be controlled by a brake control device 100 (not shown in FIG. 1, see FIG. 2 described later) according to an embodiment. The brake device is provided, for example, in a general four-wheeled vehicle.

As illustrated in FIG. 1, the brake device according to the embodiment includes a hydraulic brake 1 configured to be able to apply a braking force (friction braking torque) to four wheels 2FL, 2FR, 2RL, and 2RR, and an electric parking brake 2 configured to be able to apply a braking force to the two wheels 2RL and 2RR. In the following description, in a case where the braking force generated by the hydraulic brake 1 and the braking force generated by the electric parking brake 2 need to be distinguished, the former is described as a hydraulic braking force and the latter is described as a parking braking force.

The hydraulic brake 1 includes a pressure generating unit 32, wheel cylinders 38FL, 38FR, 38RL and 38RR, pressure adjustment units 34FL, 34FR, 34RL and 34RR, and a reflux mechanism 37. The pressure generating unit 32 is a mechanism that generates a pressure (fluid pressure) according to the operation of a brake pedal 31 by a driver of the vehicle. Each of the wheel cylinders 38FL, 38FR, 38RL, and 38RR is a mechanism that applies a braking force to the wheels 2FL, 2FR, 2RL, and 2RR by pressurizing a friction braking member. Each of the pressure adjustment units 34FL, 34FR, 34RL, and 34RR is a mechanism that adjusts the hydraulic pressures applied to the wheel cylinders 38FL, 38FR, 38RL, and 38RR. The reflux mechanism 37 is a mechanism that returns the fluid (working fluid) serving as a medium for generating the fluid pressure toward the upstream side.

More specifically, the pressure generating unit 32 includes a master cylinder 32a and a reservoir tank 32b. The master cylinder 32a is pushed accompanying the operation (stepping) of the brake pedal 31, so that the fluid to be replenished from the reservoir tank 32b is discharged to two discharge ports. The two discharge ports are respectively connected through a differential pressure control valve 33 to the front side pressure adjustment unit 34FR and the rear side pressure adjustment unit 34RL, and the front side pressure adjustment unit 34FL and the rear side pressure adjustment unit 34RR. The differential pressure control valve 33 is opened and closed under the control of the brake control device 100 (see FIG. 2) to be described later.

The pressure adjustment units 34FL, 34FR, 34RL, and 34RR each include electromagnetic valves 35 and 36 capable of electrically switching between the open state and the closed state. The electromagnetic valves 35 and 36 are provided between the differential pressure control valve 33 and a reservoir 41. The electromagnetic valve 35 is connected to the differential pressure control valve 33, and the electromagnetic valve 36 is connected to the reservoir 41.

Figure 2:
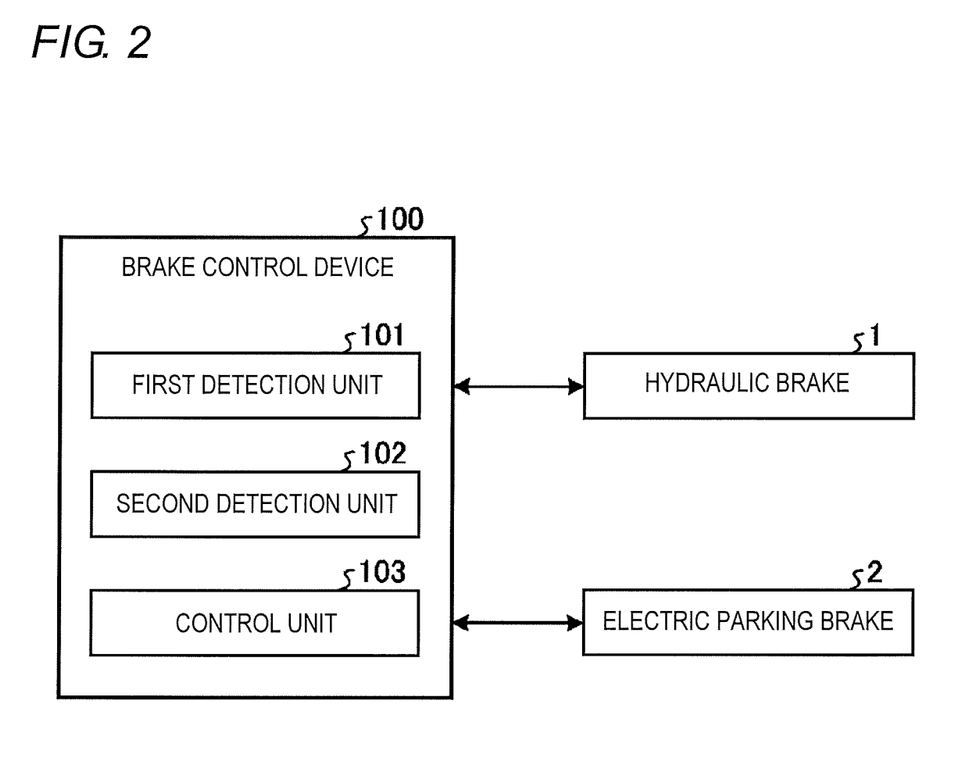
FIG. 2 is an exemplary block diagram showing a functional configuration of the brake control device according to the embodiment.

The pressures generated in the wheel cylinders 38FL, 38FR, 38RL and 38RR can be increased, maintained, or decreased by opening and closing the electromagnetic valves 35 and 36 under the control of the brake control device 100 (see FIG. 2). The wheel cylinder 38FL is connected between the electromagnetic valves 35 and 36 of the pressure adjustment unit 34FL, and the wheel cylinder 38FR is connected between the electromagnetic valves 35 and 36 of the pressure adjustment unit 34FR. Furthermore, the wheel cylinder 38RL is connected between the electromagnetic valves 35 and 36 of the pressure adjustment unit 34RL, and the wheel cylinder 38RR is connected between the electromagnetic valves 35 and 36 of the pressure adjustment unit 34RR.

The reflux mechanism 37 includes the reservoir 41 and a pump 39, and a pump motor 40 that rotates the front-side and rear-side pumps 39 to transport the fluid toward the upstream side. One of each of the reservoir 41 and the pump 39 is provided in correspondence with the combination of the pressure adjustment units 34FR and 34RL and the combination of the pressure adjustment units 34FL and 34RR.

The hydraulic brake 1 includes a stroke sensor 51 capable of detecting an operation amount (stroke) of the brake pedal 31, a pressure sensor (not shown in FIG. 1) capable of detecting a pressure generated in the master cylinder 32a, and the like.

Here, in the embodiment, an electric parking brake (EPB) motor 60 driven based on the control of the brake control device 100 (see FIG. 2) is connected to each of the rear side wheel cylinders 38RL and 38RR. Thus, in the embodiment, as the friction braking members of the rear-side wheel cylinders 38RL and 38RR are pressurized in accordance with the driving of the EPB motor 60, the braking force (parking braking force) is applied to the rear-side wheels 2RL and 2RR. Therefore, in the embodiment, the rear-side wheel cylinders 38RL and 38RR and the two EPB motors 60 connected to the two wheel cylinders 38RL and 38RR function as an electric parking brake 2 capable of generating a parking braking force separately from the hydraulic braking force by the hydraulic brake 1.

In the vehicle provided with the hydraulic brake 1 and the electric parking brake 2 as described above, the driver can cause the vehicle to generate an appropriate braking force according to the situation by appropriately performing an operation (hydraulic brake operation) of causing the hydraulic brake 1 to generate the hydraulic braking force and an operation of causing the electric parking brake 2 to generate the parking braking force. For example, in a situation where the vehicle is in the stop state only by the hydraulic brake operation, the stop state is maintained as is even if the hydraulic brake operation is released and the hydraulic braking force becomes zero in a case where sufficient parking braking force is obtained by the subsequent parking brake operation.

However, conventionally, the parking braking force is usually generated immediately after the parking brake operation is performed. Furthermore, the parking brake operation is usually performed before the release of the hydraulic brake operation is started. Thus, conventionally, in a case where the parking brake operation is performed in a situation in which the stop state of the vehicle is maintained only by the hydraulic brake operation, a load larger than a load corresponding to the braking force capable of maintaining the stop state is likely to be applied on the hydraulic brake 1 and the electric parking brake 2 as the parking braking force starts to be further generated in a situation in which a hydraulic braking force sufficient to maintain the stop state is generated.

With the configuration described below, the brake control device 100 according to the embodiment shifts the timing of the parking brake operation and the timing of driving the EPB motor 60 to appropriately control the timing the parking braking force actually starts to be generated by the parking brake operation, and suppress a load larger than the load corresponding to the braking force capable of maintaining the stop state from being applied on the hydraulic brake 1 and the electric parking brake 2.

FIG. 2 is an exemplary block diagram showing a functional configuration of the brake control device 100 according to the embodiment. For example, the brake control device 100 constitutes a part of a brake electronic control unit (ECU) having the hardware similar to an ordinary computer such as a processor and a memory. The brake control device 100 may be integrated with other parts of the brake ECU or may be configured separately from the other parts.

As illustrated in FIG. 2, the brake control device 100 is configured to be able to control the hydraulic brake 1 and the electric parking brake 2. Furthermore, the brake control device 100 includes a first detection unit 101, a second detection unit 102, and a control unit 103, as functional configurations. These functional configurations are realized, for example, as a result of the processor of the brake control device 100 executing various programs stored in the memory. In the embodiment, a part of or all of these functional configurations may be realized by dedicated circuits or the like.

The first detection unit 101 detects an operation (hydraulic brake operation) for causing the hydraulic brake 1 to generate the hydraulic braking force. The hydraulic brake operation is, for example, the operation of the brake pedal 31 by the driver. The first detection unit 101 detects the stepping operation of the brake pedal 31 by the driver, the step-back operation, and the operation amount thereof based on the detection results of the stroke sensor 51 and the like.

The second detection unit 102 detects an operation (parking brake operation) for setting the electric parking brake 2 to a state capable of generating the parking braking force. The parking brake operation is, for example, an operation such as an EPB switch or a lever (not shown in FIG. 1) provided near the driver's seat. The second detection unit 102 detects the parking brake operation by detecting an electric signal or the like output according to an operation of the EPB switch, the lever, or the like.

In a case where the parking brake operation is performed and the hydraulic brake operation is released in a situation where the stop state of the vehicle is maintained only by the hydraulic brake operation, the control unit 103 drives the EPB motor 60 of the electric parking brake 2 at the timing later than the timing at which the parking brake operation is performed. More specifically, in a case where the state in which the stop state is maintained only by the hydraulic braking force is shifted to the state in which the stop state is maintained only by the parking braking force, the control unit 103 controls the hydraulic brake 1 and the electric parking brake 2 so that the braking force per one wheel generated in the vehicle changes according to the timing chart described below.

Figure 3:
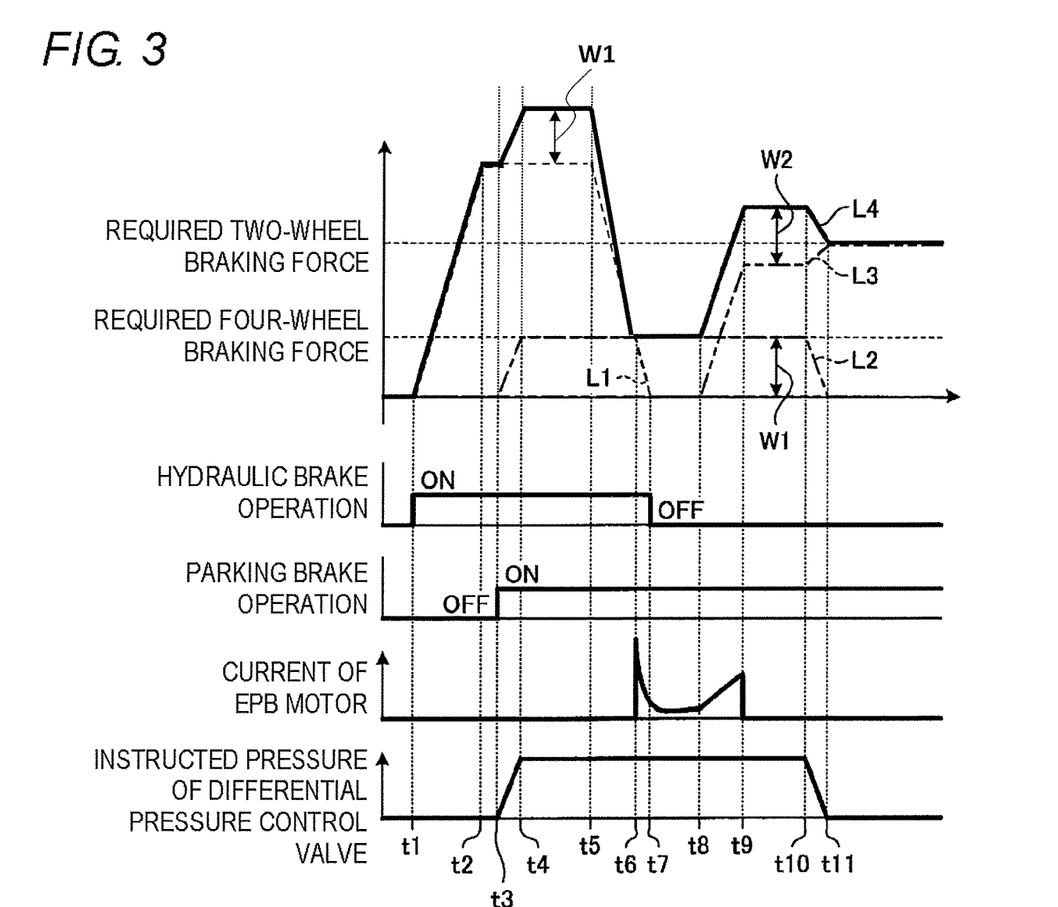
FIG. 3 is an exemplary timing chart showing change in braking force per one wheel occurring in the embodiment.

FIG. 3 is an exemplary timing chart showing change in braking force per one wheel occurring in the embodiment. In FIG. 3, a dotted line L1 represents change in the hydraulic braking force per one wheel generated by the hydraulic brake 1 according to the hydraulic brake operation, and a chain dashed line L2 represents change in the hydraulic braking force per one wheel generated by the hydraulic brake 1 according to the control of the control unit 103 independent from the hydraulic brake operation. Furthermore, in FIG. 3, a chain double-dashed line L3 represents change in the parking braking force per one wheel generated by the electric parking brake 2 according to the control of the control unit 103, and a solid line L4 represents change in the total braking force combining three kinds of braking forces represented with the dotted line L1, the chain dashed line L2, and the chain double-dashed line L3.

In the example of FIG. 3, the hydraulic brake operation is started at timing t1, and accordingly the hydraulic braking force per one wheel starts to increase (see dotted line L1 and solid line L4). At timing t2 at which the hydraulic braking force per one wheel becomes larger than the required two-wheel braking force, the increase of the hydraulic braking force stops. Here, the required two-wheel braking force is the braking force per one wheel minimum required to maintain the stop state of the vehicle by only the two wheels on the rear side, that is, the braking force per one wheel minimum required to maintain the stop state of the vehicle by only the electric parking brake 2. Furthermore, in the example of FIG. 3, the vehicle is in the stop state at timing t3 at the latest.

In the example of FIG. 3, the parking brake operation is performed at the timing t3 after the vehicle is in the stop state. The control unit 103 starts driving the differential pressure control valve 33 of the hydraulic brake 1 at the timing t3 the parking brake operation is performed. The differential pressure control valve 33 then starts to drive so as to secure an instructed pressure instructed by the control unit 103 independently of the hydraulic brake operation based on the control of the control unit 103. The instructed pressure is set to a magnitude corresponding to the braking force per one wheel minimum required to maintain the stop state of the vehicle with all four wheels, that is, the required four-wheel braking force, which is the braking force per one wheel minimum required to maintain the stop state of the vehicle by only the hydraulic brake 1. Therefore, in the example of FIG. 3, after timing t4 at which the required four-wheel braking force is secured by the differential pressure control valve 33, the hydraulic braking force having a magnitude of at least the required four-wheel braking force continues to be generated per one wheel of the vehicle regardless of the hydraulic brake operation unless the control of the control unit 103 is released (see chain dashed line L2).

Furthermore, in the example of FIG. 3, at timing t5 after the required four-wheel braking force is secured by the differential pressure control valve 33, the hydraulic brake operation starts to be released, and accordingly, the hydraulic braking force per one wheel starts to decrease (see dotted line L1, solid line L4). Here, if the hydraulic braking force per one wheel falls below the required four-wheel braking force, the stop state of the vehicle may not be maintained. However, in the example of FIG. 3, the required four-wheel braking force is already secured by the differential pressure control valve 33 at timing t4 before timing t6 at which the hydraulic braking force per one wheel drops to the required four-wheel braking force (see chain dashed line L2). Therefore, in the example of FIG. 3, the required four-wheel braking force is secured by the differential pressure control valve 33 even if timing t7 at which the hydraulic brake operation is completely released after timing t6 is reached, and hence the stop state of the vehicle is maintained (see solid line L4).

The control unit 103 then controls the EPB motor 60 of the electric parking brake 2 to shift from maintaining the stop state of the vehicle by only the hydraulic braking force of the hydraulic brake 1 (differential pressure control valve 33) to maintaining the stop state of the vehicle by only the parking braking force of the electric parking brake 2. Specifically, in the example of FIG. 3, the control unit 103 starts to supply current to the EPB motor 60 of the electric parking brake 2 at timing t6 at which the hydraulic braking force per one wheel drops to the required four-wheel braking force. Thus, the electric parking brake 2 actually starts to generate the parking braking force at timing t8 after a predetermined delay time unavoidably occurring in the mechanism has elapsed (see chain double-dashed line L3).

To shift to maintaining the stop state of the vehicle by only the parking braking force, the parking braking force per one wheel needs to be increased to at least the required two-wheel braking force. On the other hand, the sum of the hydraulic braking force and the parking braking force per one wheel is desirably not be made larger than the required two-wheel braking force. However, generally, the overall braking force decreases by a predetermined amount as the axial force applied to the pad (not shown) of the electric parking brake 2 is decreased if the hydraulic braking force is decreased. Therefore, in the embodiment, in view of such a decrease in the braking force, the sum of the hydraulic braking force and the parking braking force per one wheel is set to a value larger than the required two-wheel braking force by a predetermined amount. Specifically, in the example of FIG. 3, the driving of the EPB motor 60 is stopped at timing t9 at which the sum of the hydraulic braking force and the parking braking force per one wheel becomes a value larger than the required two-wheel braking force by a predetermined amount (see chain double-dashed line L3). In the example of FIG. 3, the control of the differential pressure control valve 33 is released at timing t10 after the timing t9, whereby the overall braking force is decreased by a predetermined amount (see solid line L4). However, in the example of FIG. 3, the overall braking force is maintained by a frictional force between a bolt (not shown) of the electric parking brake 2 and a nut (not shown) (see solid line L4). That is, in the example of FIG. 3, even if the hydraulic braking force becomes zero at timing t11, the parking braking force at timing t11 becomes a value larger than the parking braking force at timing t10 (see chain double-dashed line L3). In the example of FIG. 3, it is apparent that in the period between timing t9 and timing t10, the width W1 between the chain dashed line L2 and the horizontal axis is equal to the width W2 between the solid line L4 and the chain double-dashed line L3.

Figure 4:
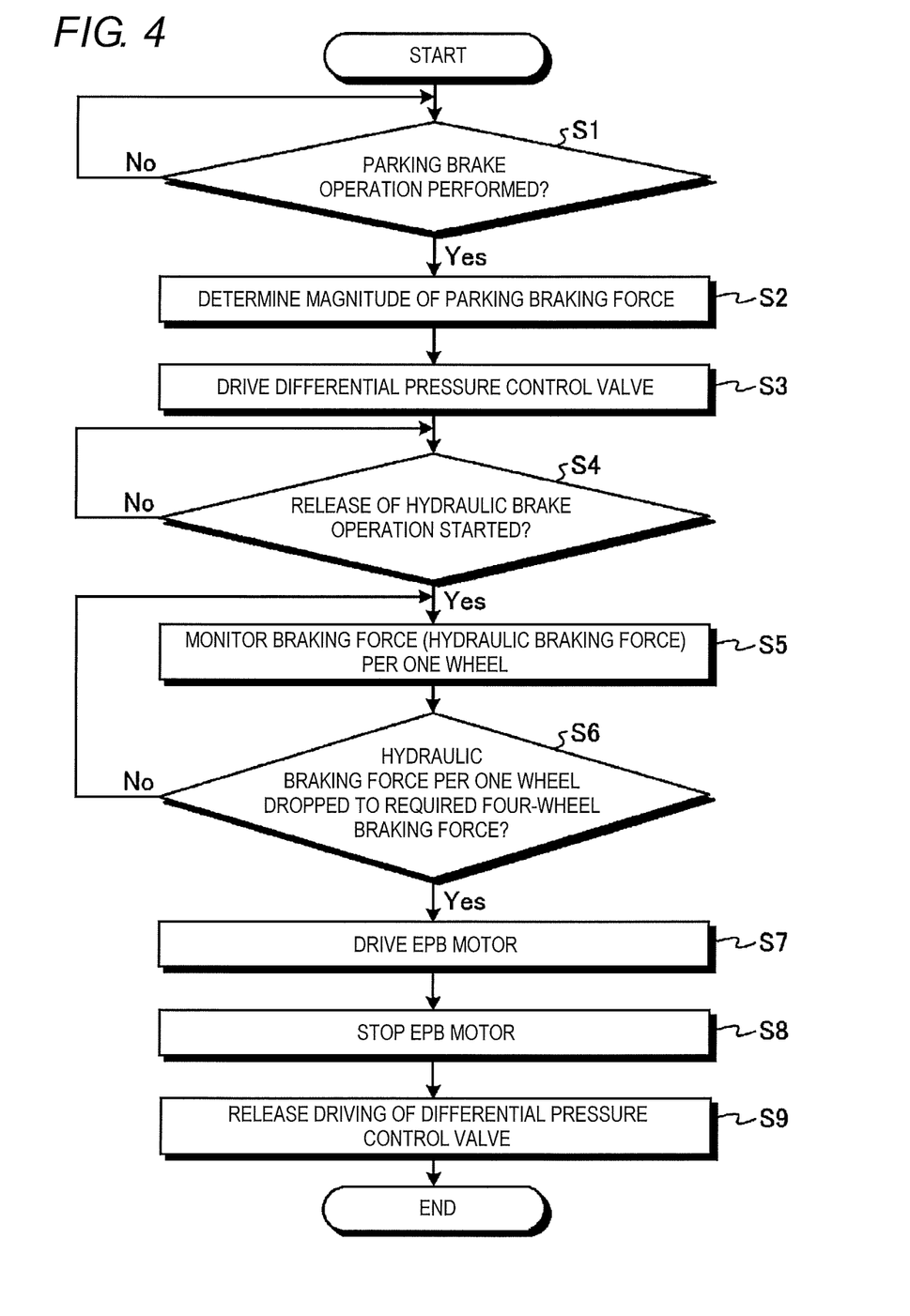
FIG. 4 is an exemplary flowchart showing a process executed by a brake control device according to the embodiment.

FIG. 4 is an exemplary flowchart showing a process executed by the brake control device 100 according to the embodiment. The processing flow of FIG. 4 is executed in a case where the vehicle is in the stop state only by hydraulic brake operation.

In the processing flow of FIG. 4, first, in S1, the second detection unit 102 detects whether or not the parking brake operation has been performed. The process of S1 is repeated until determination is made that the parking brake operation has been performed. Then, in a case where determination is made that the parking brake operation has been performed in S1, the process proceeds to S2.

In S2, the control unit 103 determines the magnitude of the parking braking force to be generated by the electric parking brake 2. More specifically, the control unit 103 determines the magnitude of the parking braking force to be generated by the electric parking brake 2 so that the sum of the hydraulic braking force and the parking braking force per one wheel is larger than the required two-wheel braking force by a predetermined amount while anticipating amount of decrease in the braking force as described above in the case where the hydraulic braking force is decreased after the hydraulic braking force is generated by the process of S3 described later.

In S3, the control unit 103 drives the differential pressure control valve 33 of the hydraulic brake 1 so that the hydraulic brake 1 holds the required four-wheel braking force. The braking force per one wheel (hydraulic braking force) applied to the vehicle thus does not fall below the required four-wheel braking force.

In S4, the first detection unit 101 determines whether or not release of the hydraulic brake operation has started. The process of S4 is repeated until determination is made that the release of the hydraulic brake operation has started. Then, in a case where determination is made that the release of the hydraulic brake operation has started in S4, the process proceeds to S5.

In S5, the control unit 103 monitors the braking force per one wheel (hydraulic braking force generated by the hydraulic brake 1 according to the hydraulic brake operation) applied to the vehicle.

In S6, the control unit 103 determines whether or not the hydraulic braking force per one wheel has dropped to the required four-wheel braking force. In a case where determination is made that the hydraulic braking force per one wheel is larger than the required four-wheel braking force in S6, the process returns to S5. On the other hand, in a case where determination is made that the hydraulic braking force per one wheel has dropped to the required four-wheel braking force in S6, the process proceeds to S7.

In S7, the control unit 103 drives the EPB motor 60 of the electric parking brake 2. The electric parking brake 2 is thereby set to a state capable of generating the parking braking force, and after a predetermined delay time in the mechanism has elapsed, the parking braking force actually starts to be generated.

In S8, the control unit 103 stops the EPB motor 60 of the electric parking brake 2. Then, in S9, the control unit 103 releases the driving of the differential pressure control valve 33 of the hydraulic brake 1. Thus, the hydraulic braking force generated according to the process of S3 becomes zero, and the parking braking force generated according to the process of S7 reaches the required two-wheel braking force and is held thereat.

As described above, in a case where the parking brake operation is performed and the hydraulic brake operation is released in a situation where the stop state of the vehicle is maintained only by the hydraulic brake operation, the control unit 103 according to the embodiment causes the electric parking brake 2 to generate the parking braking force after the braking force per one wheel (hydraulic braking force) generated by the hydraulic brake 1 dropped to the required four-wheel braking force. Thus, the parking braking force is generated after the hydraulic braking force is sufficiently decreased, whereby a load larger than the load corresponding to the braking force capable of maintaining the stop state can be suppressed from being applied to the hydraulic brake 1 and the electric parking brake 2.

Furthermore, in the above-described control, the control unit 103 according to the embodiment controls the differential pressure control valve 33 of the hydraulic brake 1 so that the required four-wheel braking force is maintained in a case where the hydraulic braking force per one wheel dropped to the required four-wheel braking force. Thus, even in a case where the hydraulic brake operation is completely released, the hydraulic braking force per one wheel does not fall below the required four-wheel braking force, and hence the stop state of the vehicle can be more reliably maintained. That is, even in a case where the hydraulic brake operation is completely released in a situation where the vehicle is in the stop state on an inclined surface such as a hill, the vehicle can be avoided from sliding down along the inclined surface. Furthermore, in a case where only the hydraulic braking force is held by the differential pressure control valve 33, the pump motor 40 does not need to be driven, and thus the noise can be reduced.

In the above described embodiment in which the feedback control is not performed, the magnitude of the parking braking force is determined at the time the parking brake operation is performed. If the required four-wheel braking force and the amount of decrease in the braking force due to the decrease in the axial force by the decrease in the hydraulic braking force is stored in the control unit 103 in advance, the parking braking force of an appropriate magnitude can be calculated by calculating on the basis of the stored value. Therefore, in the embodiment, the calculation load of the control unit 103 of the brake control device 100 can be reduced as compared with, for example, a case where the parking braking force is feedback-controlled based on the detection values of the hydraulic braking force and the parking braking force.

MODIFIED EXAMPLE

In the above described embodiment, the example in which the driving of the EPB motor 60 is started at the timing the hydraulic braking force corresponding to the hydraulic brake operation dropped to the four-wheel braking force has been described. However, effects (results) similar to the embodiment described above are obtained even if the driving of the EPB motor 60 is started at the timing other than the above if the timing at which the parking braking force starts to be generated is later than the timing at which the parking brake operation is performed.

For example, as a modified example, consider an example in which the driving of the EPB motor 60 is started at the timing the parking braking force starts to be generated after the hydraulic braking force corresponding to the hydraulic brake operation falls below the required two-wheel braking force and before the hydraulic braking force drops to the required four-wheel braking force. In this example, the parking braking force is avoided from being further generated in a situation where the hydraulic braking force of greater than or equal to the required two-wheel braking force is generated per one wheel. Therefore, in this example, the load applied to the hydraulic brake 1 and the electric parking brake 2 can be reduced.

Furthermore, the following examples can be considered as other modified examples.

First Modified Example

Figure 5:
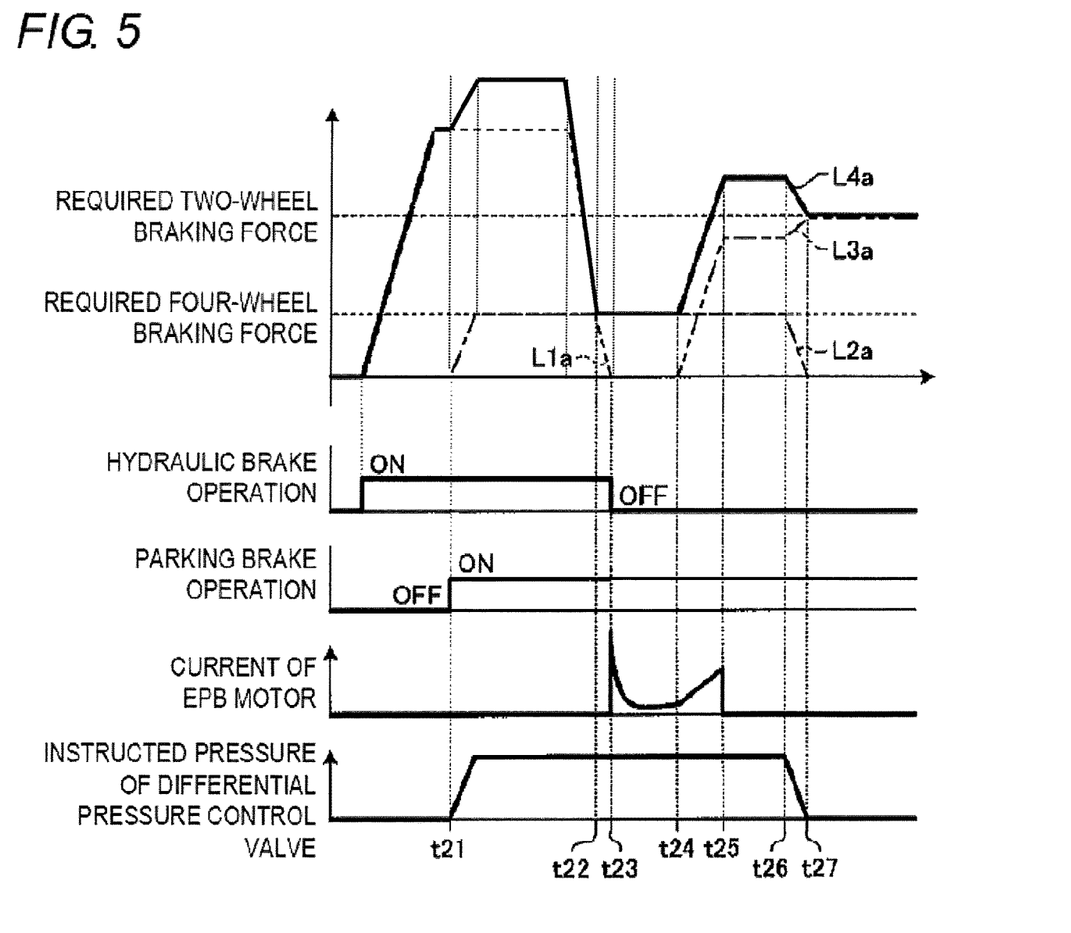
FIG. 5 is an exemplary timing chart showing change in braking force per one wheel occurring in a first modified example.

FIG. 5 is an exemplary timing chart showing change in the braking force per one wheel occurring in a first modified example. In FIG. 5, a dotted line L1a represents change in hydraulic braking force per one wheel generated according to the hydraulic brake operation, and a chain dashed line L2a represents change in hydraulic braking force per one wheel by the differential pressure control valve 33 controlled independently of the hydraulic brake operation. Furthermore, in FIG. 5, a chain double-dashed line L3a represents change in the parking braking force per one wheel generated by the electric parking brake 2, and a solid line L4a represents change in the total braking force combining three kinds of braking forces represented with the dotted line L1a, the chain dashed line L2a, and the chain double-dashed line L3a.

As shown in FIG. 5, the first modified example is similar to the embodiment described above in that the differential pressure control valve 33 generates the hydraulic braking force independently of the hydraulic brake operation at timing t21 at which the parking brake is performed. On the other hand, the first modified example differs from the embodiment described above in that the currents starts to be supplied to the EPB motor 60 not at timing t22 at which the hydraulic braking force per one wheel dropped to the required four-wheel braking force but at timing t23 at which the hydraulic brake operation is completely released.

However, the first modified example is similar to the embodiment described above in that the parking braking force actually starts to be generated in the situation where the hydraulic braking force is sufficiently decreased and only the required four-wheel braking force by the differential pressure control valve 33 is generated, although the driving timing of the EPB motor 60 is different from the above-described embodiment. Therefore, in the first modified example as well, a load larger than the load corresponding to the braking force capable of maintaining the stop state can be further suppressed from being applied to the hydraulic brake 1 and the electric parking brake 2, similar to the embodiment described above.

Various changes (see timings t25, t26, and t27 in FIG. 5) after timing t24 at which the parking braking force actually starts to be generated in the first modified example are similar to the various changes (see timings t9, t10, and t11 in FIG. 3) after timing t8 at which the parking braking force actually starts to be generated in the embodiment described above, and thus detailed description will be omitted.

Second Modified Example

Figure 6:
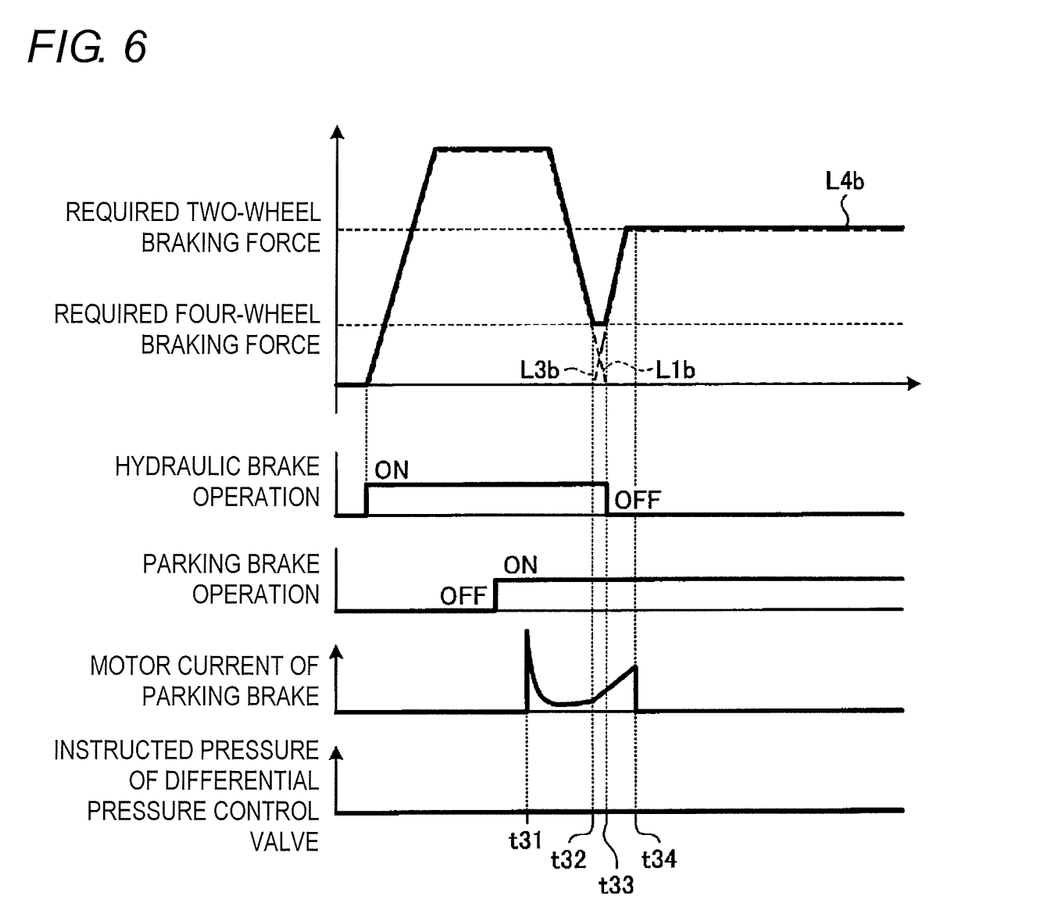
FIG. 6 is an exemplary timing chart showing change in braking force per one wheel occurring in a second modified example.

FIG. 6 is an exemplary timing chart showing change in the braking force per one wheel occurring in a second modified example. In FIG. 6, a dotted line L1b represents change in hydraulic braking force per one wheel generated according to the hydraulic brake operation, and a chain double-dashed line L3b represents change in parking braking force per one wheel generated by the electric parking brake 2. Furthermore, in FIG. 6, a solid line L4b represents change in total braking force combining two kinds of braking forces represented by the dotted line L1b and the chain double-dashed line L3b.

As shown in FIG. 6, in the second modified example, timing t31 to start supplying current to the EPB motor 60 is set in view of a predetermined delay time unavoidably occurring in the mechanism of the electric parking brake 2 so that the parking braking force actually starts to be generated at timing t32 at which the hydraulic braking force per one wheel corresponding to the hydraulic brake operation dropped to the required four-wheel braking force.

Here, in the second modified example, even in a case where the hydraulic braking force per one wheel corresponding to the hydraulic brake operation dropped to the required four-wheel braking force, the hydraulic braking force by the control of the differential pressure control valve 33 is not generated, as opposed to the embodiment described above. However, in the second modified example, as described above, the timing at which the hydraulic braking force per one wheel dropped to the required four-wheel braking force coincides with the timing at which the parking braking force actually starts to be generated. Therefore, in the second modified example, even if after the hydraulic braking force per one wheel dropped to the required four-wheel braking force, the release of the hydraulic brake operation is continued as is, the amount of decrease in the hydraulic braking force and the amount of increase in the parking braking force cancel each other out so that the total braking force per one wheel that takes into consideration both the hydraulic braking force and the parking braking force is maintained at the required four-wheel braking force.

In the second modified example, in a case where the hydraulic brake operation is completely released and the hydraulic braking force becomes zero, the amount of increase in the parking braking force cannot be canceled out, and thus the parking braking force is increased to the required two-wheel braking force. In the second modified example, the driving of the EPB motor 60 is stopped at timing t34 at which the parking braking force reaches the required two-wheel braking force. Thus, the magnitude of the parking braking force is maintained at the required two-wheel braking force. As a result, the total braking force per one wheel is also maintained at the required two-wheel braking force, and the stop state of the vehicle is maintained.

As described above, in the second modified example, the timing at which the hydraulic braking force per one wheel drops to the required four-wheel braking force coincides with the timing at which the parking braking force actually starts to be generated. Thus, the shift from maintaining the stop state only by the hydraulic brake 1 to maintaining the stop state only by the electric parking brake 2 can be rapidly carried out. Furthermore, a load larger than the load corresponding to the braking force capable of maintaining the stop state can be suppressed from being applied to the hydraulic brake 1 and the electric parking brake 2.

The embodiment and modified examples of the present invention have been described above, but the above-described embodiment and modified examples are merely examples, and it is not intended to limit the scope of the invention. The above-described novel embodiment and modified examples can be implemented in various forms, and various omissions, substitutions, or modifications can be made without departing from the spirit of the invention. Furthermore, the above-described embodiment and modified examples are included in the scope and gist of the invention, and are included in the invention described in the claims and the equivalent scope thereof.

The invention claimed is:

1. A brake control device that controls a hydraulic brake capable of generating a hydraulic braking force and an electric parking brake capable of receiving an electric current which, after a predetermined delay from starting the receiving of the electric current, causes the electric parking brake to generate a parking braking force different from the hydraulic braking force, the brake control device comprising:
    a detection unit that detects a parking brake operation for causing the electric parking brake to generate the parking braking force; and
    a control unit that starts to supply the electric current to the electric parking brake after the electric parking brake is operated by the driver, wherein the start of supply of the electric current to the electric parking brake is delayed by the control unit such that the electric parking brake generates the parking braking force in a case where the hydraulic braking force is decreased to be smaller than a first braking force, and the parking braking force is not generated before the hydraulic force is decreased to be smaller than the first braking force even if the electric parking brake is operated before the hydraulic force is decreased to be smaller than the first braking force, after a hydraulic braking force per one wheel generated by the hydraulic brake becomes lower than the first braking force per one wheel minimum required to maintain a stop state by only the electric parking brake, the accompanying parking brake operation being performed in a situation where the stop state of the vehicle is initially maintained only by hydraulic brake operation by the driver for causing the hydraulic brake to generate the hydraulic braking force and is followed by release of the hydraulic brake operation by the driver.

2. The brake control device according to claim 1, wherein the control unit causes the electric parking brake to generate the parking braking force in a case where the hydraulic braking force per one wheel is smaller than the first braking force and is greater than or equal to a second braking force per one wheel minimum required to maintain the stop state only by the hydraulic brake, after the hydraulic braking force per one wheel becomes lower than the first braking force.

3. The brake control device according to claim 2, wherein the control unit controls a differential pressure control valve of the hydraulic brake independent from the hydraulic brake operation by the driver so that the second braking force is held in a case where the hydraulic braking force per one wheel drops to the second braking force.

4. The brake control device according to claim 2, wherein the control unit controls timing to drive a motor of the electric parking brake so that timing at which the hydraulic braking force per one wheel drops to the second braking force coincides with timing at which the parking braking force starts to be generated.

* * * * *